(12) United States Patent
Kim et al.

(10) Patent No.: US 10,819,596 B2
(45) Date of Patent: Oct. 27, 2020

(54) SYSTEM AND METHOD TO ACCESS AGGREGATED METRIC DATA IN A COMPUTER NETWORK

(71) Applicant: SECUREWORKS CORP., Wilmington, DE (US)

(72) Inventors: Seungyoung Kim, Renton, WA (US); Daniel Good, Marietta, GA (US); Sai Bathina, Lawrenceville, GA (US); Ihor Bilyy, Canton, GA (US)

(73) Assignee: SecureWorks Corp., Wilmington, DE (US)

( * ) Notice: Subject to any disclaimer, the term of this patent is extended or adjusted under 35 U.S.C. 154(b) by 170 days.

(21) Appl. No.: 15/146,367

(22) Filed: May 4, 2016

(65) Prior Publication Data

US 2017/0324802 A1    Nov. 9, 2017

(51) Int. Cl.
*H04L 29/08* (2006.01)
*H04L 12/26* (2006.01)
*H04L 12/803* (2013.01)
*H04L 12/24* (2006.01)

(52) U.S. Cl.
CPC .......... *H04L 43/06* (2013.01); *H04L 41/5032* (2013.01); *H04L 43/028* (2013.01); *H04L 47/125* (2013.01); *H04L 67/2833* (2013.01)

(58) Field of Classification Search
CPC ....... H04L 67/28; H04L 67/08; H04L 67/025; H04L 47/125; H04L 43/06
USPC ........................................................ 709/202
See application file for complete search history.

(56) References Cited

U.S. PATENT DOCUMENTS

| | | | |
|---|---|---|---|
| 7,594,270 B2 | 9/2009 | Church et al. | |
| 8,079,081 B1* | 12/2011 | Lavrik | H04L 41/069 709/223 |
| 8,156,553 B1 | 4/2012 | Church et al. | |
| 81,565,853 | 3/2013 | Church et al. | |
| 8,578,393 B1 | 11/2013 | Fisher et al. | |
| 8,850,263 B1 | 9/2014 | Yourtee et al. | |
| 9,258,323 B1* | 2/2016 | Callon | H04L 47/10 |
| 2007/0169194 A1 | 7/2007 | Church et al. | |
| 2012/0317274 A1* | 12/2012 | Richter | H04L 67/1097 709/224 |
| 2014/0259145 A1 | 9/2014 | Khandelwal et al. | |
| 2015/0195291 A1* | 7/2015 | Zuk | H04L 63/168 726/23 |
| 2016/0078120 A1* | 3/2016 | Pradeep | G06F 16/173 707/737 |

* cited by examiner

*Primary Examiner* — James E Springer
*Assistant Examiner* — Patrick F Ngankam
(74) *Attorney, Agent, or Firm* — Larson Newman, LLP

(57) ABSTRACT

A metric data aggregator includes a processor and a data store. The processor is configured to obtain service level metric data from a plurality of proxy servers; obtain cloud level metric data from a plurality of proxy servers and at least one load balancer; aggregate the service level metric data and the cloud level metric data; and provide the aggregated service level and cloud level metric data to a remote user. The data store configured to store aggregated cloud level and service level metric data; and retrieve the aggregated service level and cloud level metric data in response to queries.

10 Claims, 4 Drawing Sheets

SYSTEM AND METHOD TO ACCESS AGGREGATED METRIC DATA IN A COMPUTER NETWORK

FIELD OF THE DISCLOSURE

The present disclosure generally relates to information handling systems, and more particularly relates to accessing aggregated metric data in a computer network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A metric data aggregator can include a processor and a data store. The processor can be configured to obtain service level metric data from a plurality of proxy servers; obtain cloud level metric data from a plurality of proxy servers and at least one load balancer; aggregate the service level metric data and the cloud level metric data; and provide the aggregated service level and cloud level metric data to a remote user. The data store can be configured to store aggregated cloud level and service level metric data, and to retrieve the aggregated service level and cloud level metric data in response to queries.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
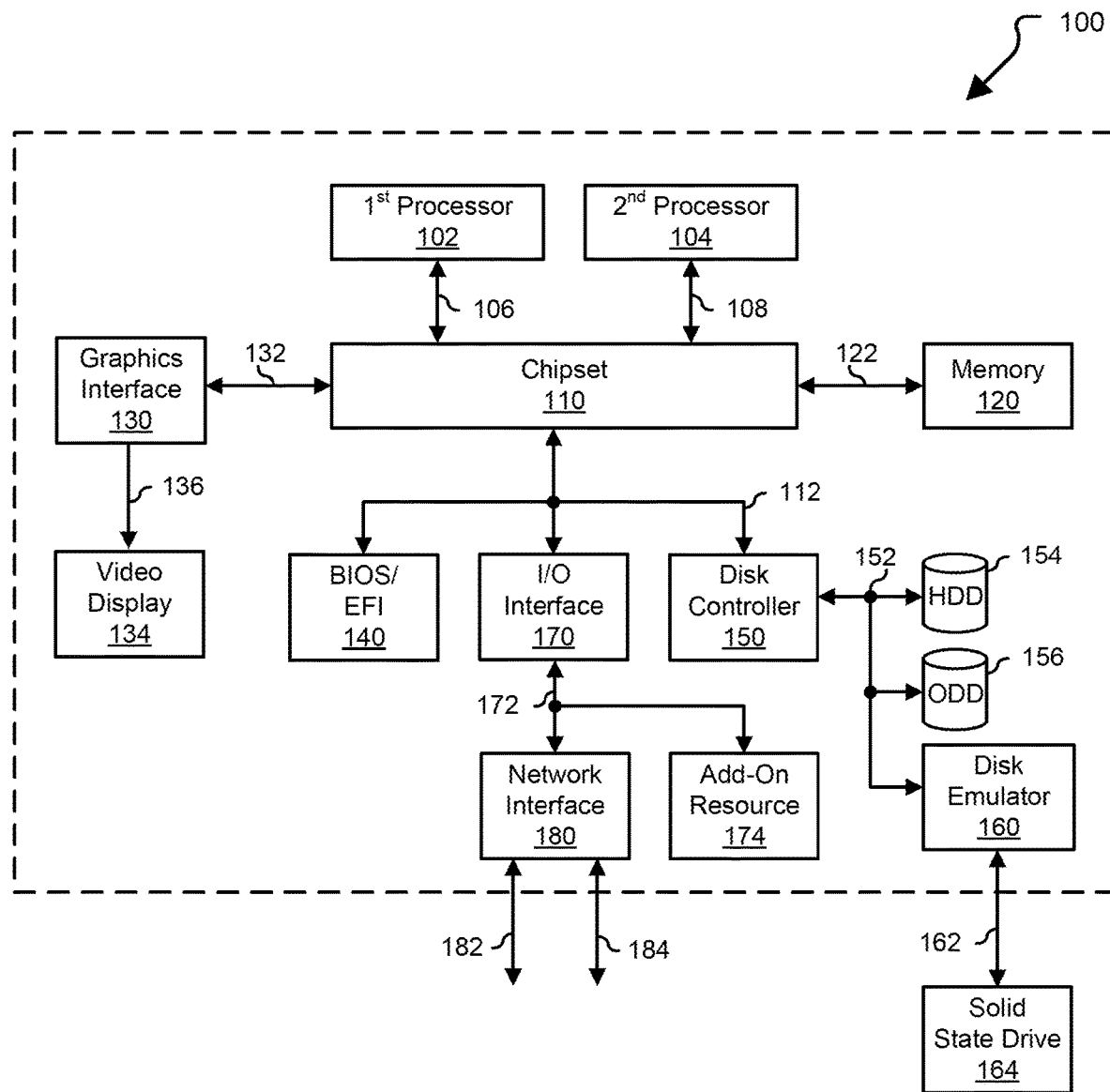
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Aggregation of Metric Data in the Cloud

Cloud platform as a service (PaaS) vendors like Amazon, Microsoft, and Google can provide cloud computing platforms to build and develop solutions. The cloud platform can be composed of services like virtual instances, cloud based load balancers and databases. PaaS providers can expose metrics around their services. In addition to these PaaS metrics, cloud based services, such as a cloud based security service, built upon the cloud platform can provide additional metrics. Aggregation of these metrics can provide a holistic view to the performance of cloud-based applications that are built upon the PaaS service utilizing the cloud-based service. To do so, the metric data needs to be aggregated and present to a user.

Metric data from multiple services can be aggregated and specially be processed in order to precisely analyze the metric relations between them. This aggregation can help to accurately analyze the current status of the system and to prevent false cases.

Figure 2:
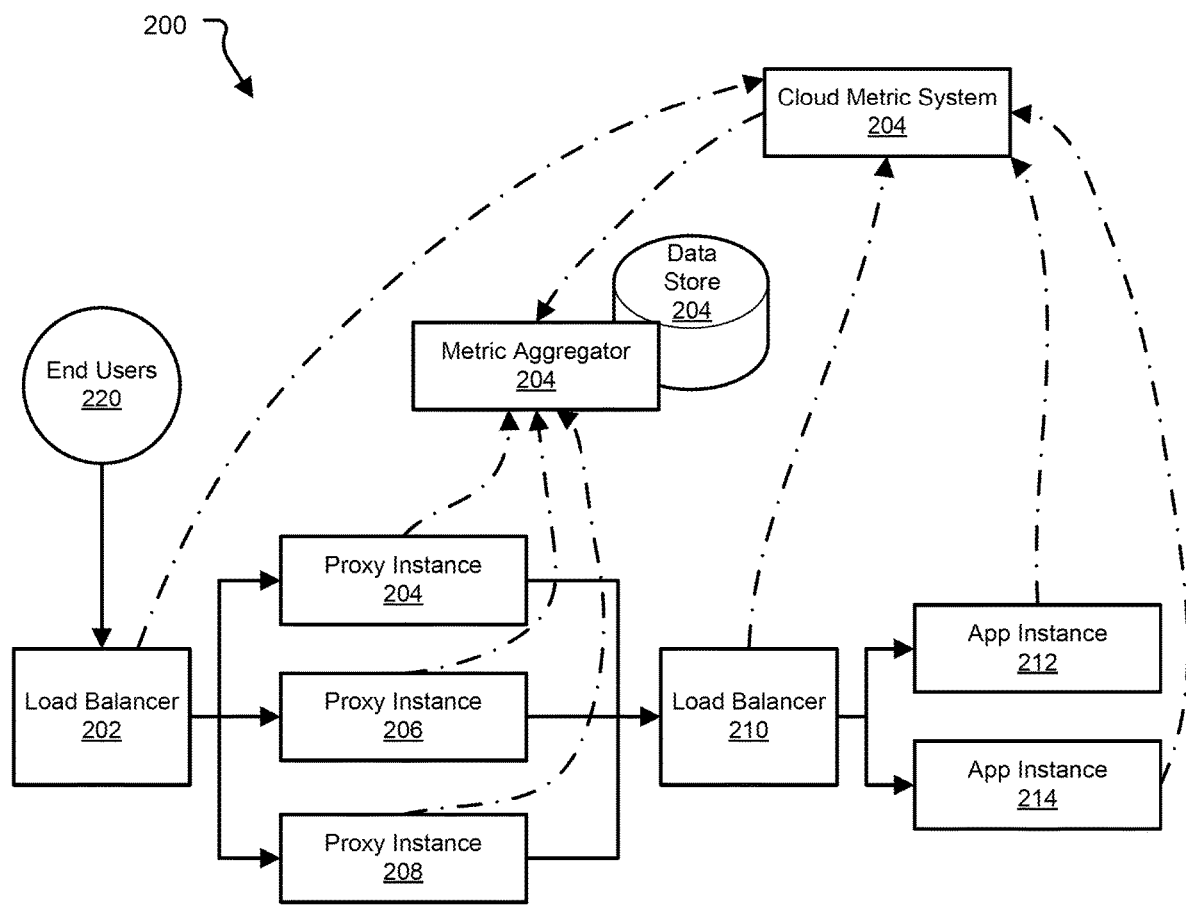
FIG. 2 is a block diagram illustrating a system for aggregating and accessing metric data, in accordance with various embodiments.

FIG. 2 is a block diagram of an exemplary system for aggregating and presenting metric data in the cloud. The cloud-based system can include a front-end load balancer 202, a plurality of sensor instances 204, 206, and 208, an back-end load balancer 210, and a plurality of application instances 212 and 214. In addition, the system can include a cloud metric system 216, a service metric aggregator 218, and a service metric data store 220.

In various embodiments, end-users 222 can send traffic flows, such as content requests, to the front-end load balancer 202. The front-end load balancer 202 can distribute the traffic flows across the plurality of sensor instances 204, 206, and 208. In various embodiments, the sensor instances 204, 206, and 208 can perform deep packet inspection on the traffic flows and discard malicious flows before forwarding the traffic flows to the back-end load balancer 210. Back-end load balancer 210 can distribute the traffic flows to application instances 212 and 214, which can process the traffic flows and send responses to the end users 222.

Cloud metric system 216 can collect cloud level metric data from each of the virtual instances in the cloud-based system, such as the front-end load balancer 202, the back-end load balancer 210, the application instances 212 and 214, and the sensor instances 204, 206, and 208. The cloud level metric data can include information such as server load (such as CPU and disk utilization), network IO (such as in-bound and out-bound packet counts), creation and destruction of instances, and the like.

Service metric aggregator 218 can collect service level metric information, such as from the sensor instances 204, 206, and 208. This metric data can include alerts of detected malicious traffic, number of dropped malicious packets, number of forwarded packets, and the like. Additionally, service metric aggregator 218 can retrieve the cloud level metric data from cloud metric system 216 to be collated along with the service level metric information. In various instances, application instances can report application level metric information to the service metric aggregator 218. The application level metric information can include information on the content provided to the users, such as the number of requests served, the number of times particular content items are accessed, the number of concurrent users, and the like. In some embodiments, the application level metric information can include numbers of failed login attempts and other security related information.

In various embodiments, the instances, such as proxy instances 204, 206, and 208 and application instances 212 and 214, can report metric data to the service metric aggregator 218 over a TCP/IP connection. The metric data can contain time information, such as when the event occurred, a metric identifier, and numeric value data. The metric identifier can include a combination of a unique hostname of the reporting instance and a metric name. In particular embodiments, the data can be formatted transmitted using a HTTP protocol with the data formatted in a XML, type format or a JSON format. Alternatively, the data can be submitted in plain text, such a common separated values and transmitted using direct TCP/IP protocol. In various embodiments, the communication between the instances can the service metric aggregator can be encrypted.

The service metric aggregator 218 can collect and aggregate the available cloud level metric data, the service level metric data, and, optionally, the application level metric data. The service metric aggregator 218 can standardize the aggregated data and store the aggregated data in the service metric data store 220. In various embodiments, the data can be merged, such as by merging alerts within a same time period. For example, if an event happens 5 times in a 10 minute period, rather than recording each time the event occurred, the data can be merged to a single record indicative that the event occurred 5 times.

In various embodiments, the service metric aggregator 218 can aggregate metric data of the same type across a plurality of host names, such as aggregating a count of a type a malicious traffic event across the plurality of sensor instances can provide a more accurate indication of changes in malicious activity than can be determined from one sensor instance alone.

The aggregated metric data can be stored in data store 220. The data store 220 can include a database of aggregated metric data, with data entries includes time information, metric identifiers, and numeric values. The data store 220 can provide a data retention policy, such as by automatically removing stale data. Stale data can be identified as data exceeding a threshold age, such as, for example, 3 months. In various embodiments, the data store can store per source individual metrics, aggregated metrics of the same kind, merged data, and the like. In various embodiments, the database can be queries by metric name, time period, metric type, source name, source type, and the like. Additionally, the database may determine average, maximum, minimum, and summation values of the metric data for a given time interval.

In various embodiments, the service metric aggregator 218 can provide a user interface for the visualization of metric data. For example, the interface can be a web-based graphical interface. In various embodiments, the interface can provide access authentication to prevent unauthorized access or tampering with the stored metric data. The interface can provide graphs based on a user's live queries or pre-defined queries. Additionally, the interface can be used to visualize multiple metrics on a single graph and can provide a time interval for the metrics based on a given start and end time. Additionally, the service metric aggregator 218 can provide a remote access to the data for second level processing, such as triggering alarms.

Figure 3:
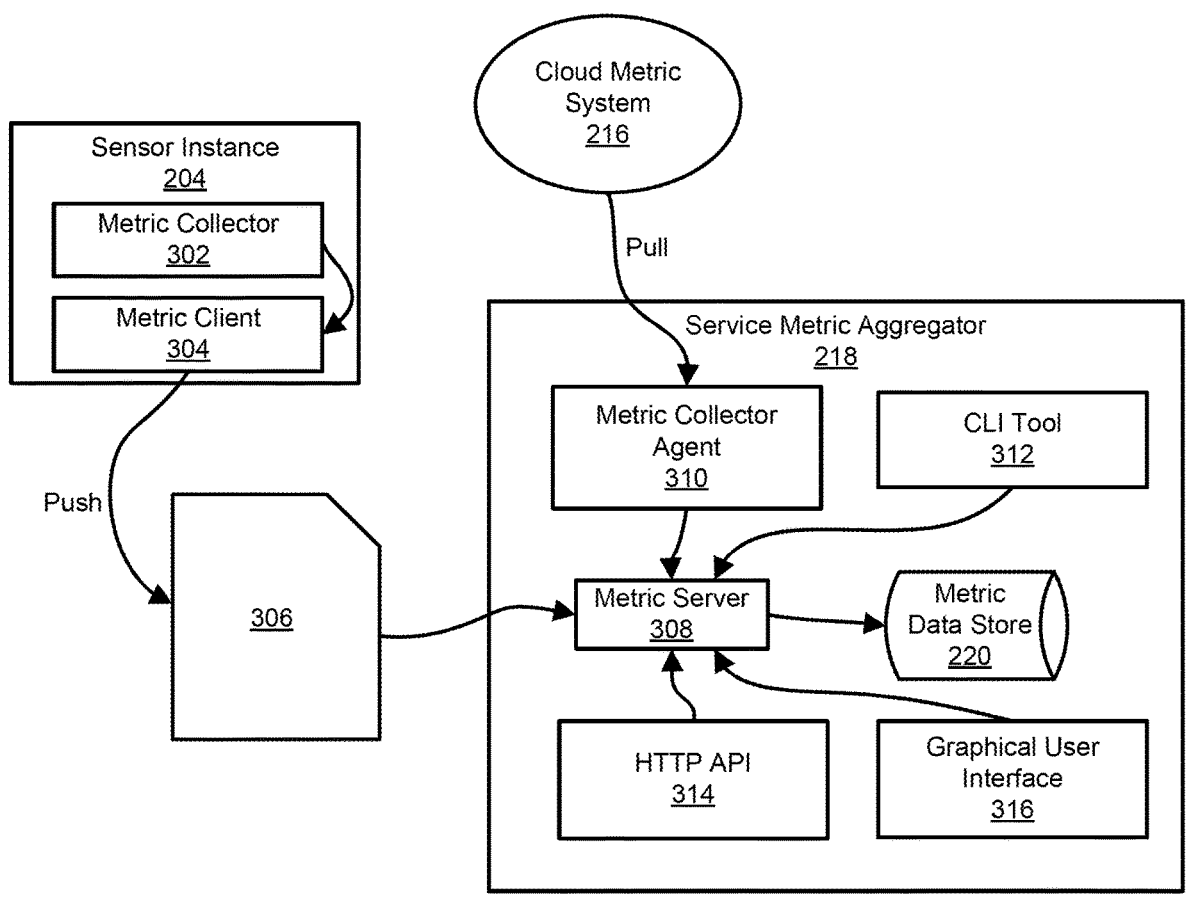
FIG. 3 is a data flow diagram illustrating a system for aggregating and accessing metric data, in accordance with various embodiments.

FIG. 3 shows a flow 300 of data in a system for aggregation of metric data. Sensor instance 204 can include a metric collector 302 that provides metric data to a metric client 304. The metric client can generate a metric message 306 and push the metric message to a metric server 308 of the service metric aggregator 218.

Service metric aggregator 218 can utilize metric collector agent 310 to pull cloud level metric data from cloud metric system 216. The metric collector agent 310 can provide the cloud level metric data to the metric server 308. Metric server 308 can communicate with metric data store 220 to store and retrieve metric data.

A Command Line Interface tool 312, a HTTP API 314, and a graphical user interface 316 can communicate with metric server to query the metric data and provide information to a user.

Figure 4:
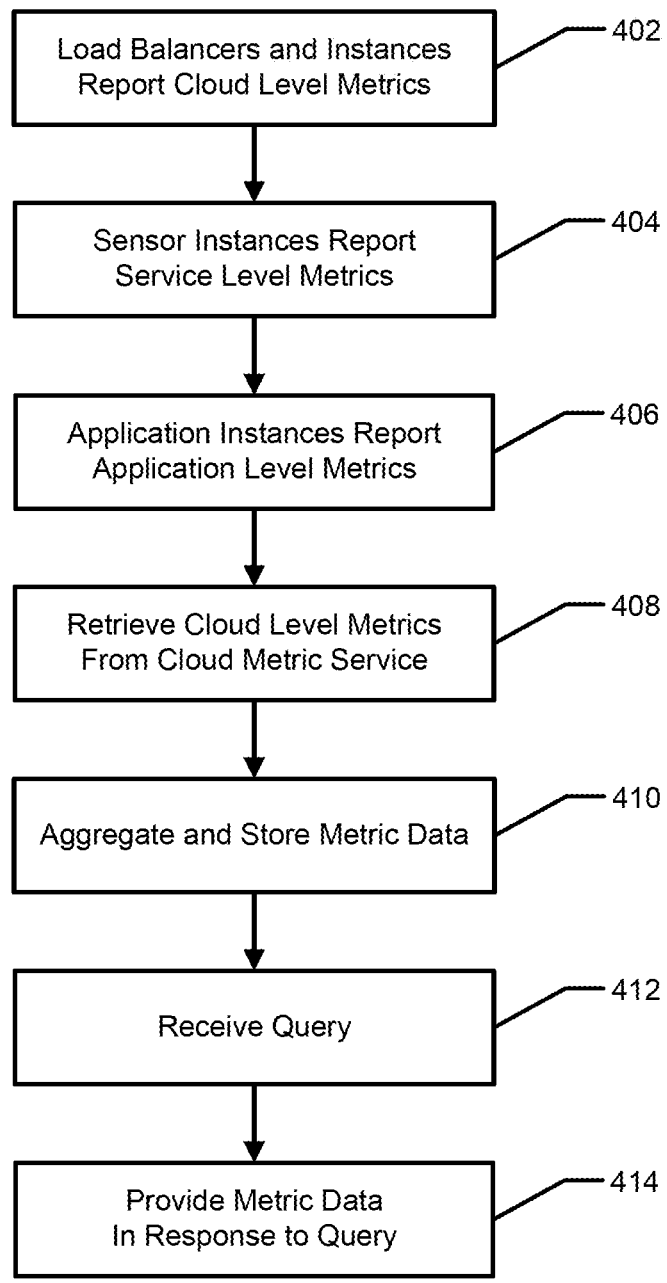
FIG. 4 is a flow diagram illustrating a method of aggregating and accessing metric data in the cloud, in accordance with various embodiments.

FIG. 4 shows a method of collecting, aggregating, and providing metric data. At 402, load balancers and instances can report cloud level metric data, such as to a cloud metric system. At 404, sensor instances can report service level metrics to the service metric aggregator. Optionally, at 406, application instances can report application level metrics to the service metric aggragator At 408, the service metric aggregator can retrieve cloud level metrics from the cloud metric service, and at 410, the service metric aggregator can aggragate and sotre the metric data.

At 412, the service metric aggregator can receive a query for the metric data. In various embodiments, the query can come as a command line query, a query through a graphical user interface, or an API query. At 414, the service metric aggregator can provide metric data in response to the query. The provided metric data can include a time series list of data points, a graph of one or more metrics over a time interval, an average value, a maximum value, a minimum value or a summation value of a metric during a time interval, or any combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A metric data aggregator comprising:
   a hardware processor; and
   a memory device accessible to the hardware processor, the memory device storing instructions that when executed cause the hardware processor to perform operations, the operations including:
   receiving metric messages sent from metric collectors monitoring network traffic flows, the metric messages describing service level metric data related to services performed by a plurality of proxy servers, the plurality of proxy servers configured to discard malicious traffic flows before forwarding legitimate traffic flows to at least one load balancer, the service level metric data including notifications of the malicious traffic flows, a number of dropped malicious packets, a number of forwarded packets, or any combination thereof;
   receiving cloud level metric data from a platform as a service provider for the plurality of proxy servers and the at least one load balancer, the cloud level metric data including a server load, a network input/output, an instance creation and destruction, or any combination thereof;
   generating aggregated metric data by aggregating the service level metric data and the cloud level metric data including aggregating any metric data of the same type across host names;
   storing the aggregated metric data in a database of aggregated metric data, the database of aggregated metric data associating the aggregated metric data to times, to metric identifiers, and to numeric values;
   after the storing of the aggregated metric data in the database of aggregated metric data, receiving a query specifying a source name;
   querying the database of aggregated metric data to identify the aggregated metric data that is associated to the source name specified by the query; and
   generating a response to the query that represents the aggregated metric data as a time series list, a graph of one or more metrics over a time interval, an average value, a maximum value, a minimum value, a summation value, or a combination thereof.

2. The metric data aggregator of claim 1 wherein the operations further include obtaining the cloud level metric data by way of a cloud metric reporting system.

3. The metric data aggregator of claim 1 wherein the operations further include obtaining an application level metric data from a plurality of application instances.

4. The metric data aggregator of claim 1 wherein the operations further include storing the aggregated metric data is stored as a time series of the aggregated metric data.

5. The metric data aggregator of claim 1 wherein the operations further include providing an interface for displaying multiple metrics on a single graph.

6. A method, comprising:
   receiving metric messages sent from metric collectors monitoring network traffic flows, the metric messages describing service level metric data related to services performed by a plurality of proxy servers, the plurality of proxy servers configured to discard malicious traffic flows before forwarding legitimate traffic flows to at least one load balancer, the service level metric data including notifications of the malicious traffic flows, a number of dropped malicious packets, a number of forwarded packets, or any combination thereof;

receiving cloud level metric data from a platform as a service provider for the plurality of proxy servers and the at least one load balancer, the cloud level metric data including a server load, a network input/output, an instance creation and destruction, or any combination thereof;

generating aggregated metric data by aggregating the service level metric data and the cloud level metric data including aggregating any metric data of the same type across host names;

storing the aggregated metric data in a database of aggregated metric data, the database of aggregated metric data associating the aggregated metric data to times, to metric identifiers, and to numeric values;

after the storing of the aggregated metric data in the database of aggregated metric data, receiving a query specifying a source name;

querying the database of aggregated metric data to identify the aggregated metric data that is associated to the source name specified by the query; and generating a response to the query that represents the aggregated metric data as a time series list, a graph of one or more metrics over a time interval, an average value, a maximum value, a minimum value, a summation value, or a combination thereof.

7. The method of claim 6, further comprising obtaining the cloud level metric data via a cloud metric reporting system.

8. The method of claim 6, further comprising obtaining an application level metric data from a plurality of application instances.

9. The method of claim 6, further comprising storing the aggregated metric data as a time series of the aggregated metric data.

10. The method of claim 6, further comprising providing an interface for displaying the aggregated metric data.

* * * * *

UNITED STATES PATENT AND TRADEMARK OFFICE
CERTIFICATE OF CORRECTION

PATENT NO. : 10,819,596 B2  
APPLICATION NO. : 15/146367  
DATED : October 27, 2020  
INVENTOR(S) : Seungyoung Kim et al.

Page 1 of 1

It is certified that error appears in the above-identified patent and that said Letters Patent is hereby corrected as shown below:

In the Claims

Column 8, Lines 58-59: Please change "storing the aggregated metric data is stored as" to --storing the aggregated metric data as--

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*